March 12, 1946.    H. SHAW    2,396,394
APPARATUS FOR DETERMINING THE ROUGHNESS OF SURFACES
Filed May 26, 1943
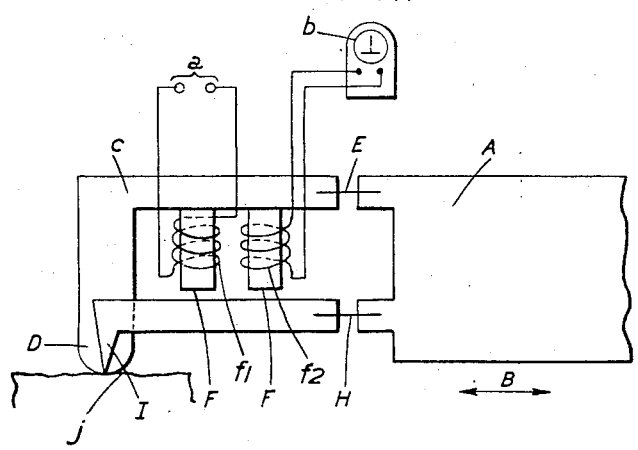
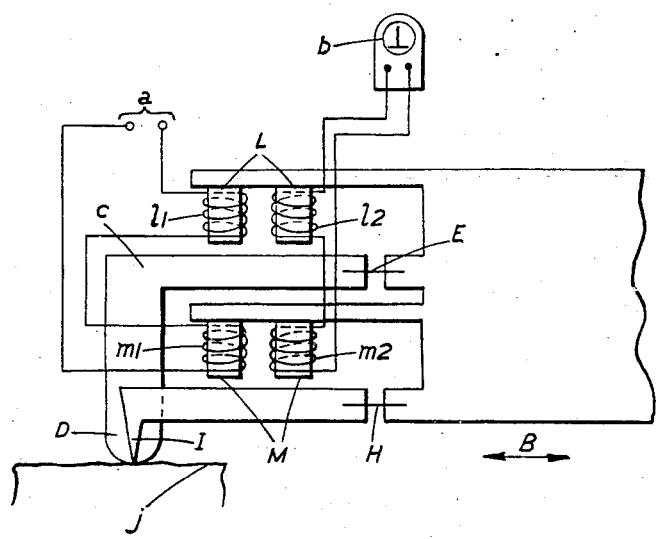
Inventor
Harry Shaw
By
Michael Striker
his agent Patented Mar. 12, 1946

2,396,394

UNITED STATES PATENT OFFICE 2,396,394

APPARATUS FOR DETERMINING THE ROUGHNESS OF SURFACES

Harry Shaw, Rochdale, England

Application May 26, 1943, Serial No. 488,614
In Great Britain December 2, 1941

4 Claims. (Cl. 73—105)

This invention relates to apparatus for determining the roughness of surfaces and the object of the invention is to prevent the particular function of the roughness it is desired to measure from falling outside the scope of the indicating or recording instruments, due to the superposition on it of a reading, on a magnified scale, of the deviation from general flatness of the surface, or of the obliquity of the surface to the natural path of the tracer (hereinafter referred to as obliquity).

In an instrument for the measurement of surface roughness according to the present invention there are two styles, one (hereinafter referred to as the tracer) being very sharp pointed, which enters the fine roughnesses of the surface, and the other (hereinafter referred to as the rider) being blunt ended, so as to ride over the surface roughnesses without entering between them. These styles are constrained by any suitable means for movement relative to the surface, and the movements of both tracer and rider in a direction normal or substantially normal to the surface to be tested, or the effects of these movements upon any suitable mechanism or mechanisms, are associated either before or after amplification and caused to give, on an enlarged scale, on suitable instruments, an indication and/or recording of the shape of the surface roughness and/or of any desired function of the surface roughness, as, for instance, the maximum height of roughness, the arithmetical average height or the root-mean-square average height.

The rider and/or its associated mechanism does not in any way hinder the free movement of the tracer, so that the latter moves in exactly the same way in relation to the surface being tested as it would if the rider and its associated mechanism were not incorporated in the instrument.

The invention is not restricted to instruments using any particular type or system of mechanism for moving the styles relative to the surface, for various mechanical, electro-mechanical, electro-magnetic, hydraulic or pneumatic means for doing this may be used and will be evident to those skilled in the art.

Neither is it restricted to instruments using any particular system of amplifying, indicating or recording mechanism, for various systems using tilting mirrors or lenses, electrical pick-up systems, piezo-crystal pick-up systems, or electromagnetic pick-up systems, operating in association with any suitable indicating and/or recording instruments such as direct current or alternating current indicating and/or recording meters of the pointer type, mirror galvanometer type, pen-on-paper type, cathode ray type, flux meter type, root-mean-square meter type, current-time-integral meter type, may be used. It should be clearly understood that the tracer is free to follow both the roughness of the surface and its obliquity or general lack of flatness, and the rider and its associated mechanism does not in any way prevent or restrict this movement.

Although the tracer is allowed freedom of movement, as mentioned, the separate movement of the rider cancels out from the indication or recording that portion of the reading that would represent the obliquity or lack of general flatness of the surface, leaving only that reading representing the function of the roughness required.

In an instrument according to the present invention both tracer and rider are free to move normally or substantially normally to the test surface, but it is only the relative movement between the rider and tracer, or some function of this relative movement that is indicated and/or recorded on an enlarged scale.

Various ways in which this invention can be carried out employing the various amplifying, indicating, or recording systems previously mentioned will readily suggest themselves to those skilled in the art, so that I will only describe herein, by way of example, one of the many possible practical ways in which the invention may be carried out.

An electrical pick-up unit rigidly attached to the end of an arm mounted upon an adjustable stand may be drawn over the surface to be tested, the arm being suitably pivoted and moved by means of a cam driven by gearing from an electric motor.

The pick-up carries a rider and a tracer, both being free to move in a direction substantially normally to the test surface, so as to maintain contact with the surface. The movement of the tracer at right angles to or substantially at right angles to the surface moves the armature of an electro-magnetic pick-up, thereby causing generation or modulation of an electrical current.

The movement of the rider, at right angles to or substantially at right angles to the test surface, may operate in a similar manner upon an electro-magnetic pick-up to cause generation or modulation of an electric current.

The two generated or modulated currents are now associated together, either before, or after amplification, so that the effective current at the indicating or recording instrument will give the desired reading of the function of the roughness.

According to a modification, the movement of the rider, instead of generating or modulating a separate current from that in the pick-up associated with the tracer, could be arranged to vary, say, the distance between the magnetic limbs of the pick-up and its armature moved by the tracer, and so affect the current generation or modulation of the pick-up.

The invention is illustrated, by way of example only, by the accompanying drawing, which should only therefore be regarded in the illustrative sense. In the drawing—

Figure 1 illustrates diagrammatically one construction of apparatus embodying the invention, and Figure 2 is a diagrammatic representation of a second construction of apparatus embodying the invention.

Referring to Figure 1, the arm A, suitably pivoted, is moved, by, say a cam, in the direction indicated by the arrow B. The arm A carries at its extremity a member C which incorporates a blunt rider D, the member C being hinged upon the arm A by a ligament E.

The member C bears two cores F of magnetic material, these being either attached to, or made integral with the member C. Each core F carries a coil, one coil $f_1$ being connected to a source $a$ of alternating current of frequency high compared with the frequency of the roughness to be measured. The second coil $f_2$ is connected to a suitable current indicating and/or recording instrument $b$. The cores F are bridged at the end where they are attached to the member C by a link of magnetic material, the member C preferably being made of magnetic material so as to act as such a link.

The arm A also carries at its extremity a lever G hinged upon A by means of a ligament H. The lever G carries a fine pointed tracer I. The lever G is made of magnetic material or has attached to it a piece of magnetic material to act as an armature, or magnetic bridge between the two cores F.

As the arm A moves in the direction of the arrow B the tracer I and the rider D will rise and fall substantially at right angles to the surface J being tested. The tracer I, being sharp pointed, will rise and fall an amount equal, or substantially equal to the fine roughnesses of the surface, plus the waviness of the surface, plus the obliquity of the surface to the natural path of the tracer.

The rider D, on the other hand, being blunt-ended, will not enter the fine roughnesses and so will only rise and fall an amount corresponding to the waviness of the surface, plus the obliquity of the surface to the natural path of the rider. Thus the lever G may move upwardly, in response to the movement of the tracer, substantially at right angles to the surface being tested, so as to reduce the gap between G and the ends of the cores F, thereby tending to increase the current in the secondary coil $f_2$ upon one of the cores F. But if at the same time the general level of the surface rises so that the cores F mounted upon the member C also move upwardly, i. e., away from the lever G in response to the movement of the rider D, then the resultant gap between the lever G and the ends of the cores F will only be varied by an amount corresponding to the difference between the movements of the rider D and the tracer I, that is relative to the fine roughness of the surface only.

Figure 2 illustrates another constructional form according to the invention. The arm A, suitably pivoted is moved by, say, a cam, in the direction indicated by the arrow B. The arm A carries at its extremity a member C which incorporates a blunt rider D, the member C being hinged to the arm A by means of a ligament E. The arm A also carries at its extremity a lever G hinged to A by means of a ligament H. The lever G carries the fine pointed style or tracer I. The arm A has two extensions each of which carries a pair of cores L and M of magnetic material. Each pair of cores is bridged at one end by magnetic material, the part to which they are attached preferably being made of such material for this purpose.

One core of each pair of cores L, M carries a primary coil $l_1$, $m_1$ which is connected to a source of alternating current $a$ of a frequency high compared with the frequency of the roughness it is desired to measure. Both these coils $l_1$, $m_1$, are preferably connected in series to the same source of alternating current.

The other core of each pair of cores L, M carries a secondary coil $l_2$, $m_2$. These secondary coils $l_2$, $m_2$ are connected to a suitable current indicating and/or recording instrument $b$ in such a manner that the instrument only indicates and/or records the difference between the currents flowing in the secondary coils $l_2$, $m_2$ or some function of this difference.

The member C and the lever G are made of magnetic material or carry pieces of magnetic material to bridge the open end of the pairs of cores L and M. As the rider D rises substantially normally to the surface being tested an amount representing the waviness of the surface, plus the obliquity of the surface, to the natural path of the rider, the gap between C and the ends of the cores L reduces, increasing the current flowing in the secondary coil $l_2$.

On the other hand as the tracer H rises an amount equal to the fine roughness of the surface, plus the waviness and obliquity of the surface, the gap between G and the ends of the cores M reduces and so the current in the secondary coil $m_2$ increases.

As the indicating and/or recording instrument associated with these secondary coils indicates and/or records only the difference between the currents flowing in them, the indicating and/or recording represents only the fine roughnesses of the surface and does not include the waviness or obliquity of the surface.

If desired, for any reason, two or more riders and their associated mechanism or mechanisms may be used, the effect of their movements being combined and associated with the effects of the tracer movement, so as to cancel out from the indication or recording the effect of the movement of the tracer due to obliquity or lack of general flatness of the surface. This applies to instruments using any of the amplifying, indicating or recording systems mentioned.

I claim:

1. An apparatus for the measurement of fine irregularities of a surface comprising in combination a common support adapted for movement parallel to said surface spaced from the same, two styles, means attaching said styles independently of each other to said common support in such a manner that each of said styles is adapted to move, independently of the other of said styles, only at least substantially perpendicular to said surface, one of said styles being a pointed tracer adapted to enter said fine irregularities of said surface, the other of said styles being a blunt ended rider adapted to slide on said surface without entering said fine irregularities of said surface but following only its general shape, said tracer being moved by said fine irregularities of said surface independently of the movement of said rider and said rider being moved by the variations of the general shape of said surface independently of the movement of said tracer when said support to which said tracer and rider are independently attached is moved at least substantially parallel to said surface with said styles in contact therewith, and indicating means functionally responsive to differential movement of said styles.

2. An apparatus for the measurment of fine irregularities of a surface comprising in combination a common support adapted for movement parallel to said surface spaced from the same, two styles, means attaching said styles independently of each other to said common support in such a manner that each of said styles is adapted to be moved, independently of the other of said styles, only substantially perpendicular to said surface, one of said styles being a pointed tracer adapted to enter said fine irregularities of said surface and to be moved by said fine irregularities, the other of said styles being a blunt ended rider unable to enter said fine irregularities of said surface and being adapted to be moved only by variations of the general shape of said surface, both said styles being moved independently of each other, namely said pointed tracer by said fine irregularities of said surface and said blunt ended rider by the variations of the general shape of the same, when said support to which said styles are attached independently of each other is moved at least substantially parallel to said surface with said styles in contact therewith, and electro-magnetic indicating means functionally responding to differential movements of said styles.

3. An apparatus for the measurement of fine irregularities of a surface comprising in combination a common support adapted for movement parallel to said surface spaced from the same, two styles, means attaching said styles independently of each other to said common support in such a manner that each of said styles is adapted to be moved, independently of the other of said styles, only at least substantially perpendicular to said surface, one of said styles being a pointed tracer adapted to enter said fine irregularities, the other of said styles being a blunt ended rider unable to enter said fine irregularities of said surface and being adapted to be moved only by variations of the general shape of said surface, both said styles being moved independently of each other, namely said tracer by said fine irregularities of said surface and said rider by the variations of the general shape of the same, when said support to which said styles are attached independently of each other is moved at least substantially parallel to said surface with said styles in contact therewith, and electro-magnetic indicating means functionally responding to differential movements of said styles, said electro-magnetic indicating means including an electro-magnetic device comprising a primary coil energised by a source of electric current and a secondary coil connected to an indicating instrument.

4. An apparatus for the measurement of fine irregularities of a surface comprising in combination a common support adapted for movement parallel to said surface spaced from the same, two styles, means attaching said styles independently of each other to said common support in such a manner that each of said styles is adapted to be moved, independently of the other of said styles, only at least substantially perpendicular to said surface, one of said styles being a pointed tracer adapted to enter said fine irregularities of said surface and to be moved by said fine irregularities, the other of said styles being a blunt ended rider unable to enter said fine irregularities of said surface and being adapted to be moved only by variations of the general shape of said surface, both said styles being moved independently of each other, namely said tracer by said fine irregularities of said surface and said rider by the variations of the general shape of the same, when said support to which said styles are attached independently of each other is moved at least substantially parallel to said surface with said styles in contact therewith, and electro-magnetic indicating means functionally responding to differential movements of said styles, said electro-magnetic indicating means including a pair of electro-magnetic devices comprising magnet systems fixedly mounted on the support, and movable armatures fixedly associated with the said two styles, said electro-magnetic devices comprising primary windings on the magnet systems connected in series to a source of electric current, and secondary windings connected in opposition to an indicating instrument.

HARRY SHAW.